(No Model.) 2 Sheets—Sheet 1.

W. CARVER.
BEAN HARVESTER AND WEED CUTTER.

No. 447,602. Patented Mar. 3, 1891.

Attest:
M. L. McDermott
E. Hepser

Inventor:
William Carver,
By E. B. Whitmore, Atty.

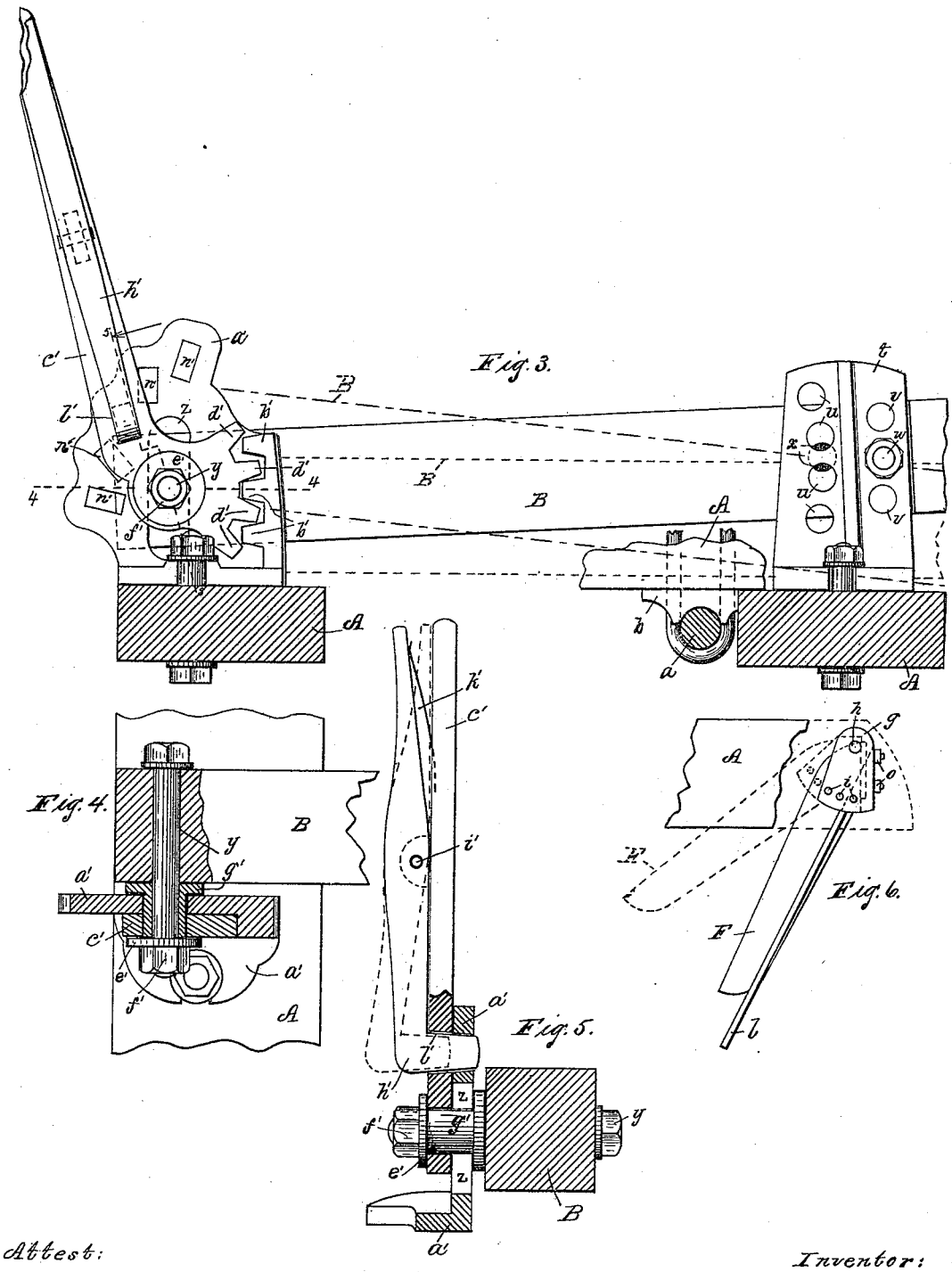

UNITED STATES PATENT OFFICE.

WILLIAM CARVER, OF SCOTTSVILLE, NEW YORK.

BEAN-HARVESTER AND WEED-CUTTER.

SPECIFICATION forming part of Letters Patent No. 447,602, dated March 3, 1891.

Application filed September 25, 1890. Serial No. 366,051. (No model.)

*To all whom it may concern:*

Be it known that I, WILLIAM CARVER, of Scottsville, in the county of Monroe and State of New York, have invented a new and useful Improvement in Bean-Harvesters and Weed-Cutters, which improvement is fully set forth in the following specification and shown in the accompanying drawings.

My invention is an improved bean-harvester and weed-cutter, the main object of the invention being to improve the device so as to better and more perfectly cut off the bean-vines and the weeds than has heretofore been done.

Figure 1:
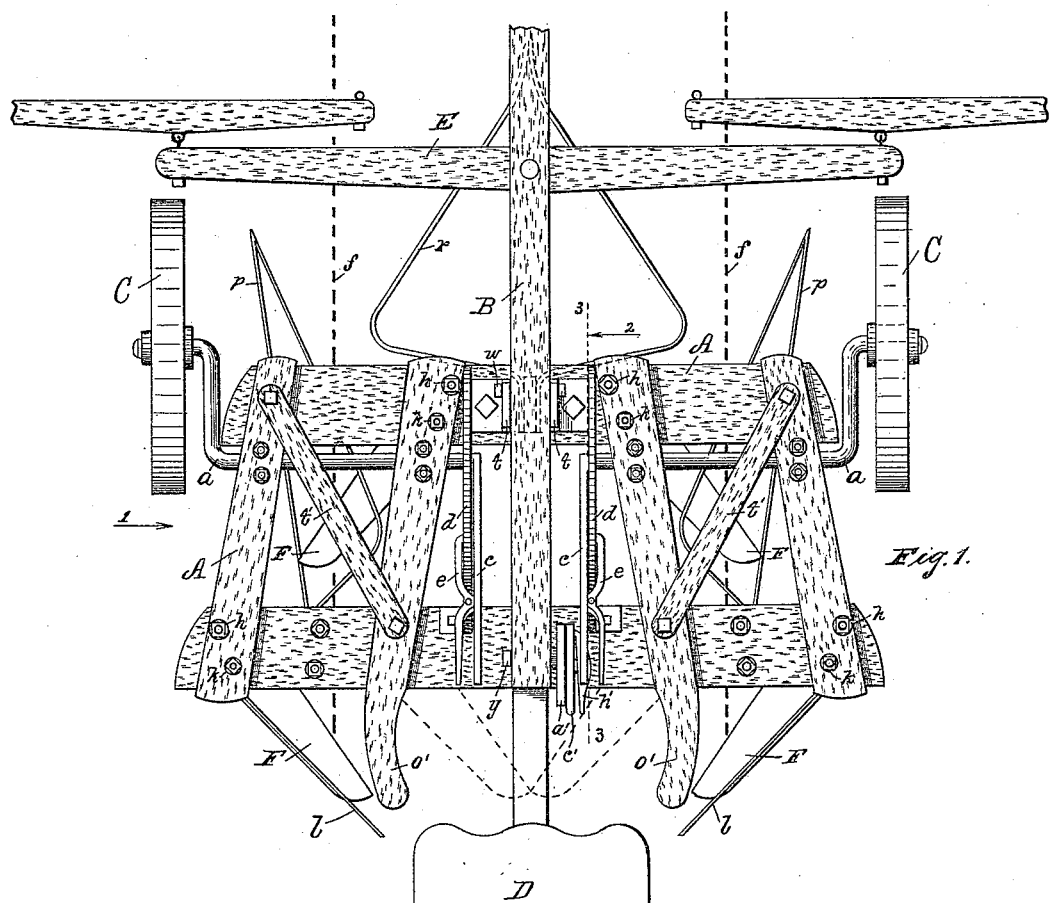
Figure 2:
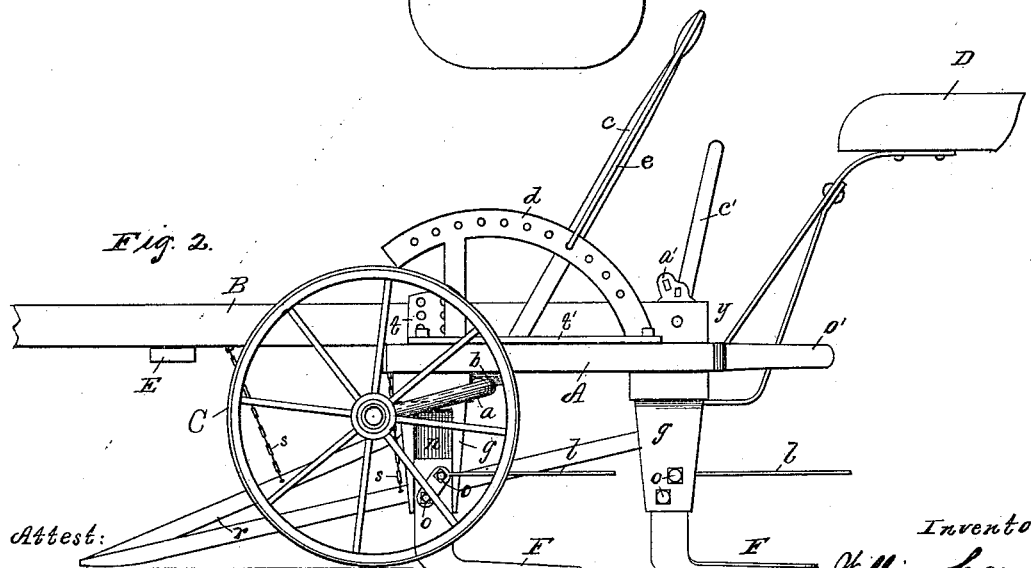

Referring to the drawings, Figure 1 is a plan of the bean-harvester; Fig. 2, a side elevation, seen as indicated by arrow 1 in Fig. 2; Fig. 3, a side elevation of the mechanism for regulating the pitch of the machine, &c., the frame being sectioned as on the dotted line 3 3 in Fig. 1, and viewed as indicated by arrow 2; Fig. 4, a horizontal section taken on the line 4 4 in Fig. 3; Fig. 5, a section taken on the line 5 5 in Fig. 3 and viewed as indicated by the arrow pointed thereon, and Fig. 6 a plan view of a blade and the holder therefor, Figs. 3 to 6, inclusive, being drawn to a scale larger than that of Figs. 1 and 2.

Referring to the parts shown in the drawings, A is the frame of the machine; B, the tongue; C, the carrying-wheels; D, the driver's seat, and E the evener for attaching the horses to. The frame is made of sticks of hard wood firmly bolted together, as shown, and stiffened by slanting braces $t'$. The frame is further provided with four horizontally-inclined separate blades F to cut the bean-vines and weeds, two of the blades being at the front and two at the rear of the machine. The forward blades have their edges turned away from each other or outward, and the rear blades have their edges turned inward toward each other.

The carrying-wheels are held at the respective outer ends of independently-acting crank-shafts $a\ a$, resting in horizontal bearings $b$, secured to the frame. At their inner ends these shafts are each provided with a hand-lever $c$, by means of which the machine as a whole or either side thereof may be raised or lowered at will to regulate the depth of the cut. Perforated quadrants $d$ are provided rigid with the frame at the side of the respective levers to hold the latter at different places of adjustment by means of snap-catches $e$, held to enter the holes in the quadrants, this particular part of the device being, however, well known and in common use.

The machine is designed to cut two rows of beans simultaneously, the latter being represented by heavy dotted lines $f$ in Fig. 1, the horses walking outside of the rows. One forward blade and one rear blade together form a pair, and the blades of each pair co-operate to cut a row of beans. The blades are so held that those of each pair cross each row of beans from opposite directions, as shown, so that the beans are cut from both sides. The forward blade of the pair, acting to cut the left-hand row of beans, for instance, is secured to the frame at a point to the right of the row, and the rear blade of the pair is secured to the frame at a point to the left of the row, and the blades forming the pair at the right of the frame are similarly held with reference to the right-hand row of beans. By having two blades to cut each row of beans, one secured to the frame at a point outside of the row and the other at a point inside of the row and cutting into the latter successively at opposite sides, the vines are completely severed from the roots; also, these blades being short tend in a less degree to drag dirt than the long blades heretofore used. The blades are held by standards or holders $g$, secured adjustably to the under surface of the frame by bolts $h$ passing up through the frame. The parts of these holders touching the frame are formed with several holes $i$, Fig. 6, in curved lines concentric with the holding-bolts $h$, up through which other bolts $k$ pass through the frame, assisting further to secure the holders rigidly to the frame. By removing the bolts $k$ and loosening the bolts $h$ the blades may be independently adjusted horizontally upon the frame— that is to say, turned so as to form a less or greater angle with the line of the advance of the machine, as shown in Fig. 6, the bolts $k$ being placed in such of the holes $i$ as may suit the necessity of the case. The blades are made of steel bars bent nearly at a right angle, the shanks of the blades resting in depressed parts or cavities $n$, Fig. 2, in the holders $g$, and are secured to the latter by ordinary clamping-bolts o. The cutting portions of the blades are substantially horizontal and are designed to cut just below the surface of the ground. Horizontal gathering-rods l are provided over the rear blades, and may also be provided for the forward blades, as shown in Fig. 2, if at any time thought necessary.

p p and r are dividers for the weeds and beans, held beneath the frame with their respective points near the ground. These dividers are made of light iron and held to the frame, so as to swing in vertical planes. Their respective forward ends are supported by chains or cables s, attached to the frame and the tongue, respectively. These dividers are laterally expanded back of their respective points and tend to collect the beans or weeds in front of the knives. The outside dividers extend to some distance in rear of the central divider r and are both laterally expanded inwardly in rear of said central divider. These cause the beans to be thrown toward the middle of the machine in rear of the divider r, the outside dividers thus serving to assist in gathering the vines into a windrow. These several dividers are also constructed so that the lines of their respective adjacent dividing-faces cross each other and the rows of beans in advance of the forward cutting-blades. On account of this the division of the beans forming each row is effected and completed before being acted upon by the blades. This is important, for when the division is done in part after the beans are cut loose from the ground they are apt to be in part carried along by the dividers and clog them.

In this improved bean-harvester I adjust the tongue vertically at two places on the frame. t, Figs. 1 and 3, are vertical jaws of iron bolted rigidly to the forward part of the frame on each side of the tongue. These jaws are provided with two rows of holes u and v, the holes of one row alternating as to height with those of the other. The holes are the same in each jaw and opposite each other, so that the bolt w may be passed horizontally through any two corresponding holes in the two jaws. The tongue is formed with two holes corresponding to the holes in the jaws, one, as shown in the drawings, being occupied by the bolt w and the other shown at x. By this means the tongue may be raised or lowered at the forward part of the machine through distances small or great, as may be required, these adjustments being for the purpose of adapting the tongue to the heights of large or small horses. The rear end of the tongue is held upon a bolt y, (see also Figs. 4 and 5,) passing horizontally through it. This bolt passes through a slot z in a rest a', bolted rigidly to the rear part of the frame. The rest is provided with teeth b', and a lever c' is formed with teeth d' to match the teeth b'. The bolt y also passes through the lever, having a washer e' and a nut f' on the outside of the lever. The slot z is wider than the diameter of the bolt, and a thimble g' is placed upon the bolt in position to pass through the slot and also the hole in the lever. When the nut f' is tightened up, it presses the washer against the thimble and holds the tongue firmly between the thimble and the head of the bolt at the opposite side of the tongue. The combined thickness of the rest a' and lever is less than the length of the reduced part of the thimble, on account of which the lever is permitted to turn freely upon the thimble, while the thimble may also slide freely along the slot z. Now when the lever c' is turned one way or the other by the driver sitting on the seat it acts to either raise or lower the rear end of the tongue, as the case may be, and give to the machine a less or greater forward pitch. A spring-catch h' is provided for the lever c', held to the latter by a pivot-pin i' and actuated by a spring k'. The lower end of the spring-catch is bent through a hole l' in the lever, and the rest a' is formed with a series of openings n' to receive the point of the catch, which extends beyond the surface of the lever adjacent to the rest. By this means the rear end of the tongue may be held in any desired position of adjustment with reference to the frame, the catch entering a hole in the rest to hold the lever in the position desired. This pitching or tilting of the machine is for the purpose of inclining the blades so as to cause them to tend to run temporarily more or less deeply into the ground, as may be required. These adjustments are independent of the adjustments of the wheels above described, which latter raises or lowers the machine as a whole. In cutting through hard clay soil, for instance, it is found that the blades are inclined to glance upward out of the ground, in which case, by depressing the rear end of the tongue by means of the lever c', the frame is given a downward pitch in front, causing the blades to tend to dig deeper in the soil. In soft sandy soil there is no tendency for the blades to glance upward, and in working in such ground the rear end of the tongue is elevated; also, in going up or down hill the pitch of the machine has frequently to be altered. By the arrangement shown these adjustments may be quickly and conveniently made by the driver without leaving his seat or stopping the team.

The frame of the machine is preferably provided with handles o' as a convenience in lifting it around.

For cutting weeds I add two other similar blades at the rear of the frame (shown in dotted lines in Fig. 1) to cut the ground left between the two forward blades. When thus supplied with cutters the machine cuts over the whole surface of the ground included between the heel portions of the outside rear blades.

What I claim as my invention is—

1. A bean-harvester constructed to cut two rows simultaneously, having a rigid trapezoidal frame, in combination with four separate and independent cutting-blades, two secured at the rear of the frame and two at the front of the frame, the rear blades having their cutting-edges turned toward each other and the forward blades having their edges turned away from each other, one rear and one forward blade on the same side of the frame constituting a pair to coact in cutting a row of beans, each of the blades being independently adjustable on the frame, substantially as shown and described.

2. A bean-harvester having a frame with cutting-blades secured thereto to cut two rows simultaneously, in combination with dividers for the beans, one being between the two rows and one on the outside of each of said rows, the two outside dividers extending back of the central divider and each having a laterally-expanded part in rear of said central divider, substantially as shown, and for the purpose set forth.

3. A harvester for beans, having a frame with cutting-blades secured thereto to cut two rows of beans at once, in combination with dividers for the beans, one on either side of each of said rows, secured to the frame so as to have the lines of the adjacent dividing-faces crossing the respective rows of beans in advance of the cutting-blades, substantially as shown and described.

4. A bean-harvester for cutting two rows of beans simultaneously, having a frame provided with two pairs of cutting-blades, one pair at the right and the other at the left of the machine, the two blades of each pair co-operating to cut a row of beans, in combination with a draft-tongue for the machine, held adjustably at two places on the machine, substantially as and for the purpose specified.

In witness whereof I have hereunto set my hand, this 22d day of September, 1890, in the presence of two subscribing witnesses.

WILLIAM CARVER.

Witnesses:
ENOS B. WHITMORE,
M. L. MCDERMOTT.